(12) United States Patent
Son et al.

(10) Patent No.: US 8,367,744 B2
(45) Date of Patent: Feb. 5, 2013

(54) SEALANT COMPOSITION FOR LIQUID CRYSTAL DISPLAY DEVICE

(75) Inventors: Ki In Son, Seoul (KR); Joo Hyun Park, Cheonan-si (KR); Gyu Won Cho, Asan-si (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 240 days.

(21) Appl. No.: 12/788,356

(22) Filed: May 27, 2010

(65) Prior Publication Data
US 2011/0086936 A1    Apr. 14, 2011

(30) Foreign Application Priority Data
Oct. 12, 2009    (KR) .................. 10-2009-0096656

(51) Int. Cl.
*C08F 2/50*    (2006.01)
*C09K 3/10*    (2006.01)
*C09K 3/00*    (2006.01)

(52) U.S. Cl. ........ 522/103; 522/100; 522/102; 522/109; 522/110; 522/111; 522/112; 522/113; 522/114; 522/121; 522/149; 522/170; 522/178; 522/182; 522/183; 522/184; 428/1.1; 428/1.5; 428/1.53; 428/1.55

(58) Field of Classification Search .............. 522/104, 522/150, 178, 179, 182, 135, 144, 100, 102, 522/103, 109, 110, 111, 112, 113, 114, 121, 522/120, 149, 170, 183, 184; 428/1.1, 1.53, 428/1.55, 1.5
See application file for complete search history.

(56) References Cited

U.S. PATENT DOCUMENTS

| | | | | |
|---|---|---|---|---|
| 5,157,078 | A * | 10/1992 | Woo et al. ............... | 525/109 |
| 5,596,023 | A * | 1/1997 | Tsubota et al. ........... | 522/100 |
| 5,654,369 | A * | 8/1997 | Tsubaki et al. ........... | 525/205 |
| 5,677,398 | A * | 10/1997 | Motoshima et al. ....... | 525/531 |
| 6,277,930 | B1 * | 8/2001 | Nishikawa .............. | 525/526 |
| 6,605,359 | B2 * | 8/2003 | Robinson et al. ......... | 428/447 |
| 6,617,385 | B1 * | 9/2003 | Klauck et al. ............ | 524/314 |
| 6,670,430 | B1 * | 12/2003 | Konarski ................ | 525/523 |
| 6,818,318 | B2 * | 11/2004 | Konarski ................ | 428/620 |
| 6,951,907 | B1 * | 10/2005 | Konarski ................ | 525/523 |
| 7,071,243 | B2 * | 7/2006 | Sato et al. .............. | 522/100 |
| 7,521,100 | B2 * | 4/2009 | Imaizumi et al. ........ | 428/1.53 |
| 7,560,145 | B2 * | 7/2009 | Ouchi et al. ............. | 428/1.1 |
| 7,678,433 | B2 * | 3/2010 | Ochi et al. .............. | 428/1.5 |
| 7,903,230 | B2 * | 3/2011 | Kitamura .............. | 349/190 |
| 2001/0053437 | A1 * | 12/2001 | Sato et al. ............. | 428/209 |
| 2009/0134358 | A1 * | 5/2009 | Tanikawa et al. ....... | 252/299.01 |
| 2010/0160474 | A1 * | 6/2010 | Lee et al. ............... | 522/42 |

* cited by examiner

*Primary Examiner* — Sanza McClendon
(74) *Attorney, Agent, or Firm* — Ladas & Parry LLP

(57) ABSTRACT

Disclosed is a sealant composition for a liquid crystal display device, the sealant composition including a (meta) acrylate compound as expressed in Chemical Formula 1 below

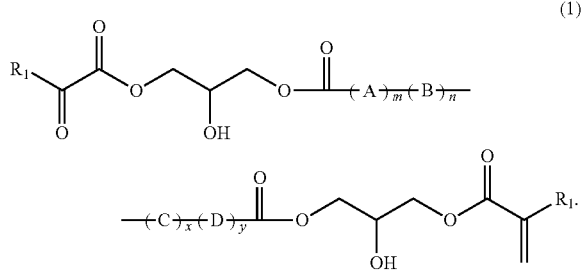

(1)

9 Claims, No Drawings

SEALANT COMPOSITION FOR LIQUID CRYSTAL DISPLAY DEVICE

CROSS-REFERENCE TO RELATED APPLICATION

This application claims the benefit of Korean Patent Application No. 10-2009-0096656, filed on Oct. 12, 2009, in the Korean Intellectual Property Office, the disclosure of which is incorporated herein by reference.

BACKGROUND

1. Field of the Invention

The present invention relates to a sealant composition, and more particularly, to a sealant composition that promotes a dispersion stability of a curable resin and an inorganic substance to reduce a time for hardening, has a superior storage stability, has a low contamination level with respect to a liquid crystal, and has an excellent adhesive strength after being hardened.

2. Description of the Related Art

A liquid crystal display (LCD) device is one type of a flat panel display (FPD) device including two substrates and a liquid crystal interposed between the two substrates. To interpose the liquid crystal between the two substrates, an edge of one of the two substrates is coated with a sealant composition, the two substrates are cohered, and the sealant composition is hardened. However, the sealant composition or a cured product thereof directly contacts the liquid crystal during a hardening process or after completing the hardening process and thus, it may be desirable for the hardening process to be quickly performed and for the sealant composition or the cured product not to be eluted. To improve robustness of an LCD device against an external force, it may be desirable for the cured product to have a strong adhesive strength.

To expand use of and mass-produce an LCD cell, a combination method of a photocuring scheme and a thermal-curing scheme is used, and an adhesive agent using an epoxy partial acrylate resin is used. A liquid crystal dropping process that uses a sealant composition for the combination of the photocuring scheme and the thermal-curing scheme is a method of manufacturing the LCD cell, and the manufacturing method may form a sealant composition pattern on one side of a transparent substrate, may drop a liquid crystal on the substrate, and may overlap the transparent substrate with another transparent substrate to form a seal. However, currently, the liquid crystal dropping process has a problem that the liquid crystal and a uncured sealant composition are contacted to each other, the sealant composition is eluted to the liquid crystal, and contamination of the liquid crystal occurs.

SUMMARY

An aspect of the present invention provides a sealant composition for a liquid crystal display (LCD) device that has excellent dispersion stability.

According to an aspect of the present invention, there is provided a sealant composition for a liquid crystal display device, the sealant composition including a (meta) acrylate compound as expressed in Chemical Formula 1 below

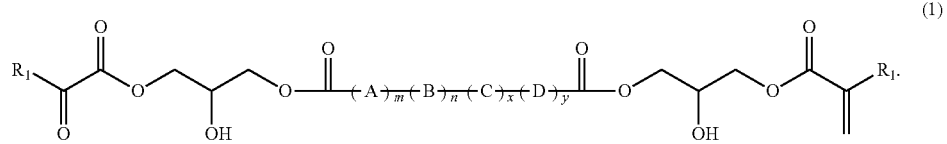
(1)

In Chemical Formula 1, $R_1$ is H or $CH_3$, each of A, B, C, and D is selected by Chemical Formulas 2 through 11 below, and each of m, n, x and y is 1 to 1000,

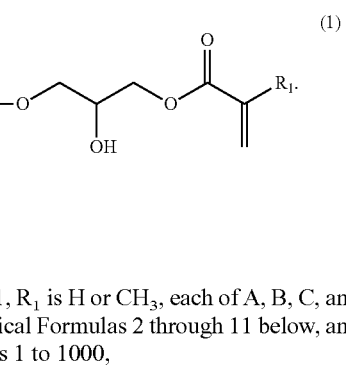
(2)

(3)

(4)

(5)

(6)

(7)

(8)

(9)

(10)

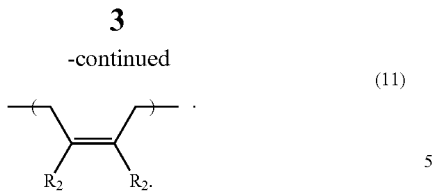

In Chemical Formulas 10 and 11, $R_2$ is H, $CH_3$, OH, SH, or $NH_2$, and in Chemical Formula 5 and w in Chemical Formula 6, each of q is 1 to 20.

Additional aspects, features, and/or advantages of the invention will be set forth in part in the description which follows and, in part, will be apparent from the description, or may be learned by practice of the invention.

Effect

According to the present invention, there may be provided a sealant composition that promotes a dispersion stability of a curable resin and an inorganic substance to reduce a time for hardening, has a superior storage stability, has a low contamination level with respect to a liquid crystal display (LCD), and has an excellent adhesive strength after being hardened.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a sealant composition for a liquid crystal display (LCD) device according to an embodiment of the present invention will be described in detail.

The sealant composition for the LCD device includes (meta)acrylate compound as expressed in Chemical Formula (1) below.

[Chemical Formula 1]

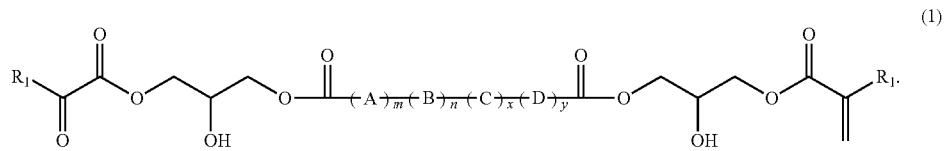

In Chemical Formula 1, $R_1$ is H or $CH_3$, each of A, B, C, and D is selected by Chemical Formulas 2 through 11 below, and each of m, n, x and y is 1 to 1000.

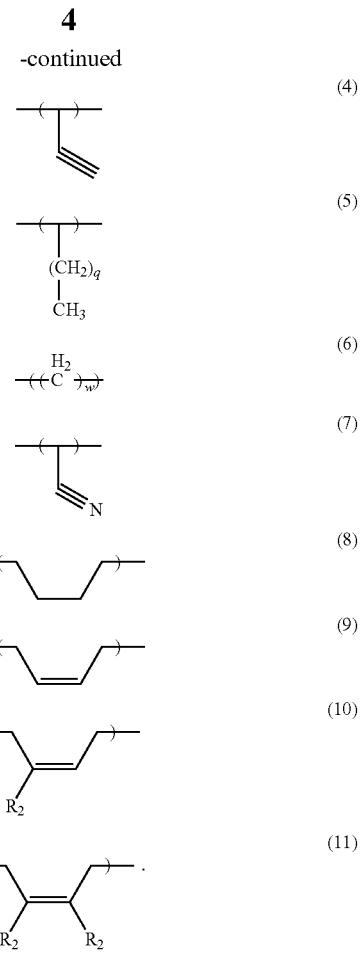

In Chemical Formulas 10 and 11, $R_2$ is H, $CH_3$, OH, SH, or $NH_2$, and each of q in Chemical Formula 5 and w in Chemical Formula 6 is 1 to 20.

The sealant composition for the LCD display according to an embodiment of the present invention may include a modified epoxy resin partly containing a (meta) acrylate group including (meta)acrylate compound of Chemical Formula 1, hereinafter a partial (meta) acrylate modified epoxy resin, and may include a thermosetting agent, a photo initiator, an inorganic filler, a thixotropic modulator, and a silane coupling agent.

The sealant composition for the LCD device according to an embodiment of the present invention may include 10 to 40 parts by weight of an additive including 1 to 50 parts by weight of a (meta)acrylate compound of Chemical Formula 1, 1 to 10 parts by weight of a thermosetting agent, 1 to 5 parts by weight of a photo initiator; and the inorganic filler, the thixotropic modulator, the silane coupling agent, and the like, for 100 parts by weight of modified epoxy resin partially including a (meta) acrylate group.

The modified epoxy resin may be cured by a thermal-curing scheme and a photocuring scheme.

A novolac-type epoxy resin, a biphenyl-type epoxy resin, a naphthalene-type epoxy resin, a trisphenol methane-type epoxy resin, a bisphenol-type epoxy resin, and the like may be used as the partial (meta)acrylate modified epoxy resin. Any one of the above epoxy resins may be used alone, or a combination of any two or more of the above epoxy resins may be used.

A resin of which viscosity is about 1000 cps to about 15000 cps may be used as the partial (meta)acrylate modified epoxy resin, and desirably, a resin of which viscosity is about 5000 cps to about 10000 cps may be used. The viscosity of the partial (meta) acrylate modified epoxy resin may be adjusted by adjusting the viscosity of the epoxy resin before synthesis.

A latent thermosetting agent that cures at a high temperature, as opposed to curing at a low temperature, may be preferably used as the thermosetting agent. An imidazole type, a dihydrazide type, and an amine type thermosetting agent may be used as the latent thermosetting agent. Particularly, it is desirable to use the dihydrazide type curing-agent to prevent contamination of a liquid crystal of a manufactured LCD device, and to improve an adhesive strength to a substrate.

As detailed examples of the imidazole type curing agent, there are 2-methyl imidazole, 1,2-dimethylimidazole, 1-cyanoethyl-2-methylimidazole, P-0505 manufacture by Shikoku corporation, and the like. As detailed examples of the dihydrazide type curing agent, there are Amicure VDH, Amicure UDH manufactured by Aginomoto, ADH, SDH, DDH, IDH manufactured by Otsuka Chemical, NDH manufactured by Japan hydrazine Co., Ltd., and the like. As detailed examples of the amine type curing agent, there are Amicure PN-23, Amicure PN-H, Amicure PN-31, Amicure PN-40, Amicure PN-23J, Amicure PN-31J, Amicure PN-40J, Amicure MY-24, Amicure MY-H, Amicure MY-HK-1, Amicure AH-203, Amicure AH-300, Amicure AH-154, and Amicure AH-163 manufactured by Aginomoto. A content of the thermosetting agent is 1 to 10 parts by weight, based on 100 parts by weight of modified epoxy resin partially including a (meta)arcylate group.

As the photo initiator, a benzoin compound, acetophenones, benzophenones, thioxanthones, anthraquinone, a-acyl oxime-esters, phenylglyoxylates, benzils, an azo compound, a di-phenyl sulfide compound, an acyl phosphine oxide compound, an organic pigment compound, an iron phthalocyanine compound, and the like may be used. Particularly, benzophenone, 2,2-diethoxyacetophenone, benzil, benzoylisopropylether, benzildimethylketal, 1hydroxylcyclohexylphenylketone, thioxanthone. A contents of the photo initiator is 1 to 5 parts by weight, based on 100 parts by weight of modified epoxy resin partly including (meta)acrylate group. Any one of the above compounds may be used alone, or a combination of any two or more of the above compounds may be used.

Silica, talc, and the like may be used as the inorganic filler. A size of a maximum particle of the filler is less than 5 μm. When the size of the maximum particle is greater than 5 μm, a cell gap is not maintained when an upper plate glass and a lower plate glass of the LCD device are adhered, and thereby causing a defect. It is desirable to use an inorganic filler having a mean particle size less than or equal to 2 μm and being uniformly distributed.

A type of the inorganic filler is not strictly limited, and includes slica, diatomite, alumina, zinc oxide, oxidized steel, oxidized magnesium, oxidized tartar, oxidized titanium, magnesium oxide, aluminum hydroxide, magnesium carbonate, barium sulphate, plaster, calcium silicate, talc, a glass bead, sericite, white clay, bentonite, aluminum nitride, silicon nitride, potassium titanate, zeolite, calcia, magnesia, ferrite, and the like. Any one of the above inorganic fillers may be used alone, or a combination of any two or more of the above inorganic fillers may be used.

A contents of the inorganic filler is 10 to 40 parts by weight based on 100 parts by weight of the modified epoxy resin partially including (meta)acrylate group. When the content of the inorganic filler is greater than 50 parts by weight, a viscosity of the sealant composition excessively increases.

An organic filler may be used instead of the inorganic filler. Examples of the organic filler that is used together with the inorganic filler may include methyl methacrylate, polystyrene, and copolymers thereof.

As the additive, a photo-initiator, a leveling agent, a viscosity modifier, a surfactant, a plasticizer, an ultraviolet (UV) absorbent, and the like, in addition to the thixotropic agent and the silane coupling agent, may be used.

As the thixotropic agent, methyl cellulose, methylethyl ketone, peroxide, oxidized-polyethylene wax, modified polypropylene emulsion, polyamide wax, organoclay, alkyl sulfate, hydroxylethyl cellulose, hydroxyl acid esters, poly vinyl alcohol, poly dimethylsiloxane, unsaturated carboxylic acid monomers, hydroxide carboxylic acid amides, ethylene glycol, diethylene glycol, alkaline earth metal hydroxides, alkaline earth metal carbonates, and the like may be used.

In addition, an inorganic particle of which mean particle size is less than or equal to 100 nm may be used as the additive, in addition to the described additive. As an example, a small amount of a fine silica, a zeolite, alumina, aluminum stearate, alumina hydroxide, mica, bentonite, and the like may be used.

A total content of the additives included in the composition is 10 to 40 parts by weight based on 100 parts by weight of the modified epoxy resin partly including (meta) acrylate group.

Hereinafter, the present invention will be described in detail by examples. It is to be understood, however, that these examples are for illustrative purpose only, and are not construed to limit the scope of the present invention.

EXAMPLES

Example 1

71 g of a modified epoxy resin including 1 g of a (meta) acrylate compound expressed as Chemical Formula 1, 2 g of a photo initiator, 10 g of SP-15 (manufactured by Osaka kasel) and 10 g of Aerosil 200 (manufactured by Degu) as an inorganic filler, 3 g of a silane coupling agent, 2 g of malonic acid dihydrazide as a thermosetting agent (MDH manufactured by ALDRICH), and 2 g of Amicure UR (manufactured by Airproduct) were mixed, the mixed composition was sufficiently milled with a 3-roll mill, and the milled composition was vacuum-deformed with a rotating-revolving deforming device and thus, a sealant composition was obtained.

Example 2

71 g of modified epoxy resin including 3 g of a (meta) acrylate compound expressed as Chemical Formula 1, 2 g of a photo initiator, 10 g of SP-15 (manufactured by Osaka kasel) and 10 g of Aerosil 200 (manufactured by Degu) as an inorganic filler, 3 g of a silane coupling agent, 2 g of malonic acid dihydrazide as a thermosetting agent (MDH manufactured by ALDRICH), and 2 g of Amicure UR (manufactured by Airproduct) were mixed, the mixed composition was sufficiently milled with a 3-roll mill, and the milled composition was vacuum-deformed with a rotating-revolving deforming device and thus, a sealant composition was obtained.

Example 3

71 g of a modified epoxy resin including 10 g of a (meta) acrylate compound expressed as Chemical Formula 1, 2 g of a photo initiator, 10 g of SP-15 (manufactured by Osaka kasel) and 10 g of Aerosil 200 (manufactured by Degu) as an inorganic filler, 3 g of a silane coupling agent, 2 g of malonic acid dihydrazide as a thermosetting agent (MDH manufactured by ALDRICH), and 2 g of Amicure UR (manufactured by Airproduct) were mixed, the mixed composition was sufficiently milled with a 3-roll mill, and the milled composition was vacuum-deformed with a rotating-revolving deforming device and thus, a sealant composition was obtained.

Example 4

71 g of a modified epoxy resin including 30 g of a (meta) acrylate compound expressed as Chemical Formula 1, 2 g of a photo initiator, 10 g of SP-15 (manufactured by Osaka kasel) and 10 g of Aerosil 200 (manufactured by Degu) as an inorganic filler, 3 g of a silane coupling agent, 2 g of malonic acid dihydrazide as a thermosetting agent (MDH manufactured by ALDRICH), and 2 g of Amicure UR (manufactured by Airproduct) were mixed, the mixed composition was sufficiently milled with a 3-roll mill, and the milled composition was vacuum-deformed with a rotating-revolving deforming device and thus, a sealant composition was obtained.

Example 5

71 g of a modified epoxy resin including 1 g of a (meta) acrylate compound expressed as Chemical Formula 1, 2 g of a photo initiator, 12 g of SP-15 (manufactured by Osaka kasel) and 8 g of Aerosil 200 (manufactured by Degu) as an inorganic filler, 3 g of a silane coupling agent, 2 g of malonic acid dihydrazide as a thermosetting agent (MDH manufactured by ALDRICH), and 2 g of Amicure UR (manufactured by Airproduct) were mixed, the mixed composition was sufficiently milled with a 3-roll mill, and the milled composition was vacuum-deformed with a rotating-revolving deforming device and thus, a sealant composition was obtained.

Example 6

71 g of a modified epoxy resin including 3 g of a (meta) acrylate compound expressed as Chemical Formula 1, 2 g of a photo initiator, 12 g of SP-15 (manufactured by Osaka kasel) and 8 g of Aerosil 200 (manufactured by Degu) as an inorganic filler, 3 g of a silane coupling agent, 2 g of malonic acid dihydrazide as a thermosetting agent (MDH manufactured by ALDRICH), and 2 g of Amicure UR (manufactured by Airproduct) were mixed, the mixed composition was sufficiently milled with a 3-roll mill, and the milled composition was vacuum-deformed with a rotating-revolving deforming device and thus, a sealant composition was obtained.

Example 7

71 g of a modified epoxy resin including 10 g of a (meta) acrylate compound expressed as Chemical Formula 1, 2 g of a photo initiator, 12 g of SP-15 (manufactured by Osaka kasel) and 8 g of Aerosil 200 (manufactured by Degu) as an inorganic filler, 3 g of a silane coupling agent, 2 g of malonic acid dihydrazide as a thermosetting agent (MDH manufactured by ALDRICH), and 2 g of Amicure UR (manufactured by Airproduct) were mixed, the mixed composition was sufficiently milled with a 3-roll mill, and the milled composition was vacuum-deformed with a rotating-revolving deforming device and thus, a sealant composition was obtained.

Example 8

71 g of a modified epoxy resin including 30 g of a (meta) acrylate compound expressed as Chemical Formula 1, 2 g of a photo initiator, 12 g of SP-15 (manufactured by Osaka kasel) and 8 g of Aerosil 200 (manufactured by Degu) as an inorganic filler, 3 g of a silane coupling agent, 2 g of malonic acid dihydrazide as a thermosetting agent (MDH manufactured by ALDRICH), and 2 g of Amicure UR (manufactured by Airproduct) were mixed, the mixed composition was sufficiently milled with a 3-roll mill, and the milled composition was vacuum-deformed with a rotating-revolving deforming device and thus, a sealant composition was obtained.

Example 9

71 g of a modified epoxy resin including 3 g of a (meta) acrylate compound expressed as Chemical Formula 1, 2 g of a photo initiator, 10 g of SP-15 (manufactured by Osaka kasel) and 10 g of Aerosil 200 (manufactured by Degu) as an inorganic filler, 4 g of silane coupling agent, 2 g of malonic acid dihydrazide as a thermosetting agent (MDH manufactured by ALDRICH), and 2 g of Amicure UR (manufactured by Airproduct) were mixed, the mixed composition was sufficiently milled with a 3-roll mill, and the milled composition was vacuum-deformed with a rotating-revolving deforming device and thus, a sealant composition was obtained.

Example 10

71 g of a modified epoxy resin including 10 g of a (meta) acrylate compound expressed as Chemical Formula 1, 2 g of a photo initiator, 10 g of SP-15 (manufactured by Osaka kasel) and 10 g of Aerosil 200 (manufactured by Degu) as an inorganic filler, 2 g of a silane coupling agent, 2 g of malonic acid dihydrazide as a thermosetting agent (MDH manufactured by ALDRICH), and 2 g of Amicure UR (manufactured by Airproduct) were mixed, the mixed composition was sufficiently milled with a 3-roll mill, and the milled composition was vacuum-deformed with a rotating-revolving deforming device and thus, a sealant composition was obtained.

COMPARATIVE EXAMPLES

Comparative Example 1

71 g of a modified epoxy resin, 2 g of a photo initiator, 10 g of SP-15 (manufactured by Osaka kasel) and 10 g of Aerosil 200 (manufactured by Degu) as an inorganic filler, 3 g of a silane coupling agent, 2 g of malonic acid dihydrazide as a thermosetting agent (MDH manufactured by ALDRICH), and 2 g of Amicure UR (manufactured by Airproduct) were mixed, the mixed composition was sufficiently milled with a 3-roll mill, and the milled composition was vacuum-deformed with a rotating-revolving deforming device and thus, a sealant composition was obtained.

Composition mixed in Examples 1 through 11 and Comparative Example 1 for obtaining the sealant composition are denoted as given in Table 1 below.

TABLE 1

|  | Resin | | Filler | | PI | Coupling agent | $C_A$ | $C_B$ |
|---|---|---|---|---|---|---|---|---|
|  | $R_A$ | $R_B$ | $F_A$ | $F_B$ | TPO | Silane Compound | $C_A$ | $C_B$ |
| Example 1 | 70 | 1 | 10 | 10 | 2 | 3 | 2 | 2 |
| Example 2 | 68 | 3 | 10 | 10 | 2 | 3 | 2 | 2 |
| Example 3 | 61 | 10 | 10 | 10 | 2 | 3 | 2 | 2 |
| Example 4 | 41 | 30 | 10 | 10 | 2 | 3 | 2 | 2 |
| Example 5 | 70 | 1 | 12 | 8 | 2 | 3 | 2 | 2 |
| Example 6 | 68 | 3 | 12 | 8 | 2 | 3 | 2 | 2 |
| Example 7 | 61 | 10 | 12 | 8 | 2 | 3 | 2 | 2 |
| Example 8 | 41 | 30 | 12 | 8 | 2 | 3 | 2 | 2 |
| Example 9 | 68 | 3 | 10 | 10 | 2 | 4 | 2 | 2 |
| Example 10 | 61 | 10 | 10 | 10 | 2 | 2 | 2 | 2 |
| Comparative Example 1 | 71 |  | 10 | 10 | 3 | 3 | 2 | 2 |

In Table 1, a unit of all material is "g". $R_A$ and $R_B$ are mixed and used as the resin. $R_A$ is a bisphenol A-diglycidly compound, and is a (meta)acrylate compound in which a molar ratio of a (meta)acrylate group and an epoxy group is 1:1. $R_B$ is (meta)acrylate compound as expressed in Chemical Formula 1. $F_A$ and $F_B$ are mixed and used as the filler (inorganic filler). $F_A$ is SP-15 (manufactured by Osaka kasel), and $F_B$ is Aerosil 200 (manufactured by Degu). TPO (manufactured by Iracure TPO, Ciba) is used as a photo initiator (PI). The silane compound used as the coupling agent is Z-6040 (manufactured by Dowcorning). $C_A$ and $C_B$ are mixed and used as the thermosetting agent. $C_A$ is malonic acid dihydrazide (MDH manufactured by ALDRICH), and $C_B$ is Amicure UR (manufactured by Airproduct).

Evaluation on Characteristic of Sealant Composition

Evaluation on Adhesive Strength

Each sealant composition obtained from Examples 1 through 10 and Comparative Example 1 was applied to a center of a washed ITO glass substrate (manufactured by Samsung Corning precision glass), and another identical glass substrate was laid thereon. A specimen for measuring an adhesive strength was made by performing thermal-curing at 120° C. for 30 min after performing UV-curing at 2000 mJ/cm². The adhesive strength was evaluated by using a tensile strength tester with respect to each specimen. A result of the evaluation is denoted as given in Table 2 below.

Pressure Cooker Test (PCT)

The specimen for measuring the adhesive strength which is manufactured for evaluating the adhesive strength was stored at 121° C., 100% R.H., and 2 atm for six hours, and the adhesive strength was evaluated by using the tensile strength tester with respect to each specimen. A result of the evaluation is denoted as given in Table 2 below.

Liquid Crystal Contamination ($T_{N-1}$)

1 g of each sealant composition obtained from Examples 1 through 10 and Comparative Example 1 were inputted into an ampul, and subsequently 1 g of liquid crystal was inputted into the ampul and left the sample in the ampul as is for 1 hour. The sample in the ampule was thermal-cured at 120° C. for 30 min after being UV cured at 2000 mJ/cm². A $T_{N-1}$ value of each sample and a $T_{N-1}$ value of a blank liquid crystal are measured at a heating rate of 5° C./min by using a DSC measurement instrument. As the $T_{N-1}$ value of each sample is close to the $T_{N-1}$ value of the blank liquid crystal, a contamination level with respect to the liquid crystal is small. Accordingly, when the $T_{N-1}$ value of each sample is changed more than 0.5° C., the liquid crystal is evaluated as defective. A result of the evaluation is denoted as given in Table 2 below.

Storage Stability

Each sealant composition obtained from Examples 1 through 10 and Comparative Example 1 was stored at a room temperature for two weeks, and a viscosity was measured with a spindle viscometer. When a change rate obtained by comparing an original viscosity with a viscosity after two weeks is less than or equal to 100%, the liquid crystal was determined as being good, and when the change rate obtained by comparing the original viscosity with the viscosity after two weeks is greater than 100%, the liquid crystal was determined as being defective. A result of the evaluation is denoted as given in Table 2 below.

TABLE 2

| | result | | | |
|---|---|---|---|---|
| | Adhesive strength | PCT | $T_{Ni}$ | Storage Stability |
| Example 1 | 1.1 | 0.9 | Good | Good |
| Example 2 | 1.2 | 1.0 | Good | Good |
| Example 3 | 1.6 | 1.6 | Good | Good |
| Example 4 | 1.4 | 0.8 | Defective | Good |
| Example 5 | 1.2 | 1.1 | Good | Good |
| Example 6 | 1.2 | 1.0 | Good | Good |
| Example 7 | 1.4 | 1.2 | Good | Good |
| Example 8 | 1.3 | 1.0 | Defective | Good |
| Example 9 | 1.4 | 1.1 | Good | Defective |
| Example 10 | 1.4 | 1.3 | Good | Good |
| Comparative Example 1 | 0.9 | 0.7 | Good | Good |

Referring to Table 2, the sealant composition manufactured through Examples of the present invention generally has excellent adhesive strength compared with the sealant composition manufactured through Comparative Examples. The adhesive strength after the Pressure Cooker Test is also excellent, a reactivity with a liquid crystal is small, and the storage stability is good.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A sealant composition for a liquid crystal display device, the sealant composition comprising:

a (meta) acrylate compound as expressed in Chemical Formula 1 below

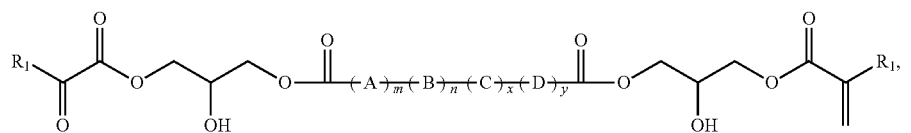
(1)

wherein $R_1$ is H or $CH_3$, each of A, B, C, and D is selected by Chemical Formulas 2 through 11 below, and each of m, n, x and y is 1 to 1000,

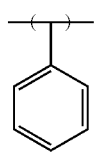 (2)

 (3)

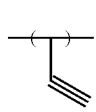 (4)

-continued

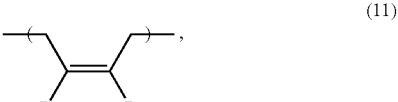 (11)

wherein $R_2$ is H, $CH_3$, OH, SH, or $NH_2$ in Chemical Formulas (10) and (11), and each of q in Chemical Formula (5) and w in Chemical Formula (6) is 1 to 20.

2. The sealant composition of claim 1, wherein a molecular weight of the (meta) acrylate compound of Chemical Formula (1) is about 10,000 to 100,000.

3. A sealant composition for a liquid crystal display device, the composition comprising:
 100 parts by weight of modified epoxy resin partly including a (meta) acrylate group;
 1 to 10 parts by weight of a thermosetting agent;
 1 to 5 parts by weight of a photopolymerization initiator; and
 1 to 50 parts by weight of a (meta) acrylate compound as expressed in Chemical Formula (1) below,

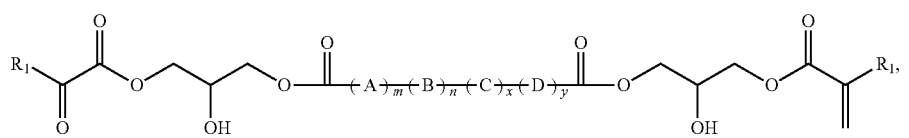
(1)

wherein $R_1$ is H or $CH_3$, each of A, B, C, and D is selected by Chemical Formulas (2) through (11), and each of m, n, x, and y is 1 to 1000, -continued

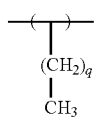 (5)

 (6)

 (7)

 (8)

 (9)

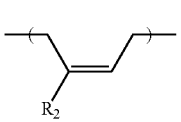 (10)

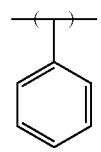 (2)

 (3)

 (4)

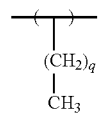 (5)

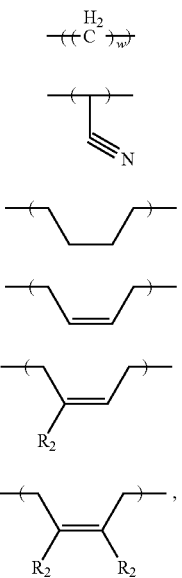

wherein $R_2$ is H, $CH_3$, OH, SH, or $NH_2$, and each of q in Chemical (5) and w in Chemical (6) is 1 to 20.

4. The sealant composition of claim 3, further comprising: 10 to 40 parts by weight of at least one additive of an inorganic filler, a thixotropic modulator, and a silane coupling agent.

5. The sealant composition of claim 3, wherein a viscosity of the modified epoxy resin is about 1000 cps to 15000 cps.

6. The sealant composition of claim 3, wherein the modified epoxy resin includes at least one resin selected from a group consisting of a novolac-type epoxy resin, a biphenyl-type epoxy resin, a naphthalene-type epoxy resin, a trisphenol methane-type epoxy resin, and a bisphenol-type epoxy resin.

7. The sealant composition of claim 3, wherein the thermosetting agent includes at least one selected from a group consisting of imidazoles, dihydrazides, and amines.

8. The sealant composition of claim 3, wherein the photopolymerization initiator includes at least one selected from a group consisting of a benzoin compound, acetophenones, benzophenones, thioxanthones, anthraquinone, α— acyl oxime-esters, phenylglyoxylates, benzils, an azo compound, a di-phenyl sulfide compound, an acyl phosphine oxide compound, an organic pigment compound, and an iron phthalocyanine compound.

9. The sealant composition of claim 4, wherein the thixotropic modulator includes at least one selected from a group consisting of methyl cellulose, methyl ethyl ketone peroxide, oxidized-polyethylene wax, modulated polypropylene emulsion, polyamide wax, organoclay, alkyl sulfate, hydroxyl ethyl cellulose, hydroxyl acid esters, poly vinyl alcohol, poly dimethylsiloxane, unsaturated carboxylic acid monomers, hydroxide carboxylic acid amides, ethylene glycol, diethylene glycol, alkaline earth metal hydroxides, and alkaline earth metal carbonates.

* * * * *